United States Patent
Klein et al.

[15] 3,640,684
[45] Feb. 8, 1972

[54] PREPARATION OF CUPROUS OXIDE

[72] Inventors: Lawrence C. Klein, Hubbell, Mich.; Laurence G. Stevens, Des Plaines, Ill.

[73] Assignee: Universal Oil Products Company, Des Plaines, Ill.

[22] Filed: Jan. 13, 1970

[21] Appl. No.: 2,671

[52] U.S. Cl. ................................................23/147, 75/103
[51] Int. Cl. ........................................C01g 3/02, C22b 3/00
[58] Field of Search ......................23/147, 337, 338; 75/103

[56] References Cited

UNITED STATES PATENTS 2,898,185   8/1959   Boyd et al. ..............................23/338
3,492,115   1/1970   Mahalla ...................................23/147

*Primary Examiner*—Oscar R. Vertiz
*Assistant Examiner*—Hoke S. Miller
*Attorney*—James R. Hoatson, Jr. and Bernard L. Kramer

[57] ABSTRACT

Preparing cuprous oxide from an aqueous cuproammonium solution containing cuprous and cupric ions by contacting the solution with an ion exchange resin in which cupric ions are retained and cuprous ions are not. The raffinate passing through the ion exchange resin is withdrawn and heated to evolve ammonium ions and to form cuprous oxide. The cuprous oxide then is recovered by filtering and drying.

6 Claims, No Drawings

PREPARATION OF CUPROUS OXIDE

BACKGROUND OF THE INVENTION

Present commercial methods for the recovery of copper from ores, ore concentrates, secondary metals, metal scrap, etc., is to dissolve the metallic copper in a cupro-ammonium solution. Various cupro-ammonium solutions are referred to as leaching liquors and include ammoniacal and ammonium carbonate liquors. The leaching liquor is maintained at a desired cupric-cuprous ratio which, in some cases, may be maintained by circulating the leaching liquor through some oxidizing circuit. These steps are well known in the art and no novelty is claimed herein for the same.

DESCRIPTION OF THE INVENTION

The aqueous cupro-ammonium solution described above contains both cuprous ions and cupric ions. In accordance with the present invention this solution is contacted with an ion exchange resin in which the cupric ions are retained and the cuprous ions are not. By this treatment, the solution being withdrawn from the ion exchange resin is substantially free of cupric ions. The solution then is decomposed by heating to evolve ammonia and carbon dioxide and to precipitate cuprous oxide. The cuprous oxide is recovered in any suitable manner and results in a premium value cuprous oxide product.

As hereinbefore set forth any suitable leaching liquor is used to dissolve metallic copper from ores, ore concentrates, secondary metals, alloys, etc. In a preferred method, the leaching liquor comprises oxidized copper ammonium carbonate solution. As hereinbefore set forth the cupric-cuprous ratio is maintained at the desired level and is accomplished by some form of oxidation and/or by reducing the copper to the maximum commercially feasible by correlating with the copper in the ore or other source of the metal. This is desirable in order to insure maximum solubility of the copper in the solution.

The solution prepared in the above manner contains a mixture of cuprous ions and cupric ions. In general the cuprous ions will comprise a major proportion of the cupric-cuprous ions and typically the cuprous ions will comprise about 90 percent and the cupric ions about 10 percent of the mixture. For various uses, a more concentrated cuprous oxide product is desired and this is obtained by the novel method of the present invention.

In accordance with the present invention, the cupro-ammonium solution is subjected to ion exchange treatment. Any suitable ion exchange resin which selectively retains cupric ions and rejects cuprous ions may be used. A number of such ion exchange resins are available commercially either in ammonia form or in the carboxylic acid form. In the latter case, the resin may be converted to the ammonia form by passing ammonia therethrough in any suitable and well-known manner. A particularly preferred ion exchange resin is available commercially as weak acid cation exchange "Duolite CC-3" and is said to be a polyacrylic carboxylated weak cation exchange resin. The resin is converted to the ammonia form in any suitable manner as hereinbefore set forth. Another suitable resin is available as C-281c, ammonia form.

The cupro-ammonium solution is passed, either downward but preferably upward, through a bed of the ion exchange resin. Any suitable temperature above the freezing point and below the boiling point of the solution may be used and generally will range from about 50° to about 200° F., with ambient temperature being preferred. In the ion exchange treatment, cupric ions are retained and a water white solution comprising cuprous ammonium ions are discharged from the ion exchange zone. The solution is passed through the ion exchange resin at a predetermined rate, which will be selected to effect complete retention of the cupric ions. In a preferred method, two or more ion exchange beds are employed and alternated as required. When one bed becomes saturated with cupric ions, the flow therethrough is discontinued and switched to the alternate bed, while the first bed is being regenerated in the manner to be hereinafter described.

The water white solution emerging from the ion exchange resin is charged into a distillation zone, autoclave or any other suitable equipment which previously had been evacuated of oxygen with an inert gas. The distillation zone, autoclave or the like is heated to a temperature in excess of 175° F. and preferably in excess of 210° F. for a sufficient time to evolve ammonia and carbon dioxide and to precipitate the copper as cuprous oxide. In general the temperature will be within the range of from 210° to 500° F. or more.

The cuprous oxide product formed in the above manner is filtered hot and dried in the absence of oxygen. In another method the solution may be first cooled to from about 40° to 100° F. or more and preferably about ambient temperature, then filtered in the presence of air and finally dried in the absence of oxygen. The drying is effected at any suitable temperature and generally will be in the range of from about 100° to about 250° F. or more. When the cupro-ammonium solution used in the first step of the process does not comprise carbonate, an alkali, such as sodium hydroxide or potassium hydroxide, is added to the solution either before or during the decomposition with heat to produce the desired cuprous oxide product.

The cupric copper retained in the resin may be eluted therefrom in any suitable manner to regenerate the resin for further use in the process. The cupric copper is attached to the resin as a cupro-ammonium complex and may be eluted from the resin with a strong solution of ammonium carbonate with excess ammonium such as is formed on condensing the vapors from the distillation step when the cupro-ammoniun carbonate solution is used. This eluted solution then can be used for leaching additional copper metal to prepare a reduced solution for ion exchange as aforesaid.

From the above description, it will be seen that the novel process of the present invention provides an improved method for preparing substantially pure cuprous oxide which, as hereinbefore set forth, is a premium product for various uses.

We claim:

1. The method of preparing cuprous oxide from an aqueous cupro-ammonium solution containing cuprous and cupric ions resulting from leaching of metallic copper, which comprises contacting said solution with an ion exchange resin in which cupric ions are retained and cuprous ions are not, withdrawing the raffinate containing cuprous ions and heating the same to a temperature of from about 175° to about 500° F. in the substantial absence of oxygen to precipitate cuprous oxide.

2. The method of claim 1 in which the cupric-ammonium solution used for said leaching is an oxidized copper ammonium carbonate solution.

3. The method of claim 1 in which said ion exchange resin is a polyacrylic carboxylated weak cation exchange resin in ammonium form.

4. The method of claim 1 in which the cuprous oxide product is filtered to recover the cuprous oxide which is dried in the absence of oxygen at a temperature of from about 100° to about 250° F.

5. The method of claim 1 in which the cuprous oxide product is cooled to about 40°–100° F., filtered in the presence of air, and then dried in the absence of oxygen.

6. The method of claim 1 in which the retained cupric ions are eluted with a solution of ammonium carbonate and excess ammonia, and the eluted solution is used to prepare the first-mentioned cupro-ammonium solution.

* * * * *